United States Patent
Kao et al.

(10) Patent No.: US 9,921,393 B2
(45) Date of Patent: Mar. 20, 2018

(54) WAFER-LEVEL METHODS FOR MAKING APERTURED LENSES INVOLVING SEQUENTIAL LAYERING OF BIPLANAR TRANSPARENT FILM, OPAQUE LAYER, SPACER WAFER, AND LENS WAFER

(71) Applicant: OmniVision Technologies, Inc., Santa Clara, CA (US)

(72) Inventors: Min Ching Kao, Santa Clara, CA (US); Chia-Yang Chang, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 568 days.

(21) Appl. No.: 14/477,258

(22) Filed: Sep. 4, 2014

(65) Prior Publication Data

US 2016/0070089 A1    Mar. 10, 2016

(51) Int. Cl.
G02B 13/14    (2006.01)
B32B 38/00    (2006.01)
(Continued)

(52) U.S. Cl.
CPC ......... *G02B 13/0085* (2013.01); *G02B 5/005* (2013.01); *B29D 11/00307* (2013.01);
(Continued)

(58) Field of Classification Search
None
See application file for complete search history.

(56) References Cited

U.S. PATENT DOCUMENTS

2007/0126898 A1*    6/2007  Feldman .................. G02B 9/12
                                                            348/294
2009/0308525 A1    12/2009  Lin et al.
(Continued)

FOREIGN PATENT DOCUMENTS

JP    2003123330 A  *  4/2003
TW    201000954 A     1/2010

OTHER PUBLICATIONS

English translation of Abstract of Fujimori (JP 2003-123330 A), retrieved from EAST database on Jan. 5, 2017.*
(Continued)

*Primary Examiner* — Stephone B Allen
*Assistant Examiner* — Ryan S Dunning
(74) *Attorney, Agent, or Firm* — Lathrop Gage LLP (57) ABSTRACT

A wafer-level lens forming method for forming an aperture wafer wherein the aperture wafer is stacked with one or more lens wafers to form apertured lens systems. The aperture wafer is formed by lithographically depositing an opaque layer on a transparent film, which is supported by a substrate. The aperture wafer is stacked with one or more lens wafers, and appropriate spacing between the wafers is set with spacer wafers. The substrate is removed, and the lens and aperture wafers are adhered together in a stack to form an optical system. The method avoids accumulation of residual material on the lens during the opaque-layer deposition process. The resulting optical system benefits from added flexibility of the lens system design due to the ability to locate the aperture with respect to one or more lenses independently of the lens wafers.

7 Claims, 7 Drawing Sheets

(51) Int. Cl.
*B32B 38/10* (2006.01)
*B32B 37/24* (2006.01)
*B32B 37/12* (2006.01)
*G02B 13/00* (2006.01)
*G02B 5/00* (2006.01)
*B29D 11/00* (2006.01)

(52) U.S. Cl.
CPC ............... *B32B 37/24* (2013.01); *B32B 38/10* (2013.01); *B32B 2037/243* (2013.01); *B32B 2307/412* (2013.01); *B32B 2551/00* (2013.01)

(56) References Cited

U.S. PATENT DOCUMENTS

| | | | |
|---|---|---|---|
| 2011/0002053 A1* | 1/2011 | Ovrutsky | B29D 11/00278 359/738 |
| 2011/0031510 A1* | 2/2011 | Rossi | G02B 3/0062 257/88 |
| 2012/0113318 A1 | 5/2012 | Galstian et al. | |
| 2015/0340397 A1* | 11/2015 | Seo | H01L 27/14627 257/432 |

OTHER PUBLICATIONS

Translation of an Office Action corresponding to Taiwanese Patent Application No. 104129070, dated Jul. 7, 2016, 3 pages.
Translation of an Office Action corresponding to Taiwanese Patent Application No. 104129070, dated Mar. 3, 2017, 2017, 4 pages.

\* cited by examiner

WAFER-LEVEL METHODS FOR MAKING APERTURED LENSES INVOLVING SEQUENTIAL LAYERING OF BIPLANAR TRANSPARENT FILM, OPAQUE LAYER, SPACER WAFER, AND LENS WAFER

BACKGROUND

Miniaturized optics are required for many applications, including small cameras used in mobile devices. Manufacture of miniaturized optics may take advantage of semiconductor-type fabrication techniques in which optical components, such as lenses, are created on wafers. The wafers may be stacked together to form complete lens systems. The result is a cost-effective and scalable method for production of small form factor optics.

SUMMARY OF THE INVENTION

In an embodiment, a wafer-level method for making apertured lenses includes: (a) forming an aperture wafer that has at least one aperture disposed on a substrate, separately from a lens wafer that has at least one lens, (b) adhering the aperture wafer to the lens wafer to form a stacked wafer, and (c) removing the substrate from the aperture wafer.

In an embodiment, a wafer-level apertured lens system includes (a) a lens layer having a lens and (b) an aperture layer forming an aperture and adhered to the lens layer, the aperture layer and lens layer being located on opposite sides of a planar interface, the aperture being aligned with the lens for controlling light propagation through the wafer-level apertured lens system.

DETAILED DESCRIPTION OF THE EMBODIMENTS

Common optical lens systems include one or more lenses and an aperture to control the path and amount of light propagating through the lens system. Conventional wafer-level methods for manufacturing miniaturized optics with apertured lenses include forming the apertures directly on a lens wafer by applying a layer of opaque material thereon. Disclosed herein are wafer-level methods for forming apertured lenses, as well as apertured lens systems produced from these methods. The presently disclosed wafer-level method creates an aperture wafer separately from one or more associated lens wafers. These methods provide advantages over the prior art. In particular, the methods prevent the accumulation of residual opaque material on the lenses, which typically occurs in conventional wafer-level methods during the opaque-layer deposition process. Additionally, the resulting apertured lens systems benefit from added flexibility in the lens system design due to the ability to locate the aperture, with respect to one or more lenses, independently of the lens wafers.

Figure 1:
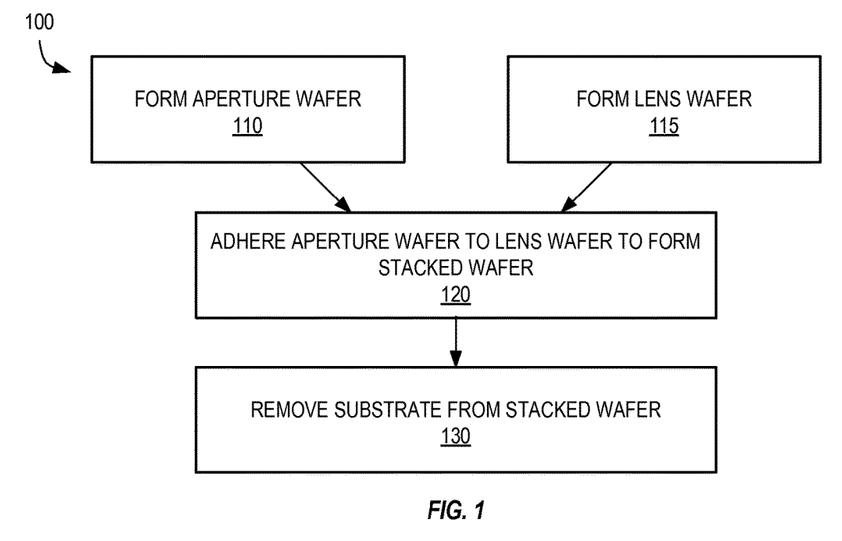
FIG. 1 is a block diagram showing one wafer-level method for making aperture lenses, according to an embodiment.

FIG. 1 is a block diagram that shows one exemplary wafer-level method 100 for making apertured lenses. A step 110 of forming an aperture wafer, including at least on aperture, and a step 115 of forming a lens wafer, including at least one lens, are carried out separately. Carrying out steps 110 and 115 separately provides advantages over the prior art, as mentioned above. The aperture wafer formed in step 110 includes a substrate with an opaque aperture-forming layer disposed thereon. In a step 120, the aperture wafer formed in step 110 is adhered to the lens wafer formed in step 115 to form a stacked wafer. In a step 130, the substrate is removed from the aperture wafer of the stacked wafer.

Figure 2:
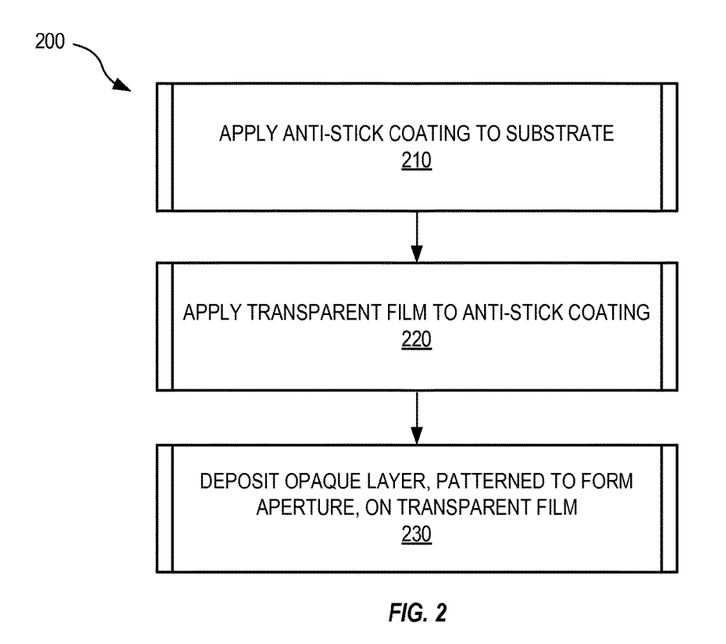
FIG. 2 is a block diagram showing steps of forming an aperture wafer, according to an embodiment.

FIG. 2 is a block diagram illustrating one exemplary method 200 of forming an aperture wafer. Method 200 is an embodiment of step 110 of FIG. 1. In a step 210, a chemical coating is applied to a substrate to reduce stickiness, referred to herein as an anti-stick coating. In an embodiment, the anti-stick coating is applied by vapor deposition. In a step 220, a transparent film is applied to the anti-stick coating. In this disclosure, "transparent" refers to being at least partially transmissive to light in a desired wavelength range. In an embodiment, the transparent film is a polymer resin applied on top of the anti-stick coating. The polymer resin is, for example, deposited on the anti-stick coating in a set of thin lines using a tool, whereafter the polymer resin spreads to cover the desired portion of the anti-stick coating surface. Next, the polymer resin is cured. In an example, the polymer resin is a ultraviolet (UV) curable polymer resin, which is cured by exposure to UV light. In a step 230, an opaque layer is deposited on top of the transparent film, where the opaque layer forms at least one aperture. In an embodiment, the opaque layer consists of black photo resist or chromium. The at least one aperture may be formed after initial application of the opaque layer to the transparent film, using methods known in the art such as photolithography.

Figure 3:
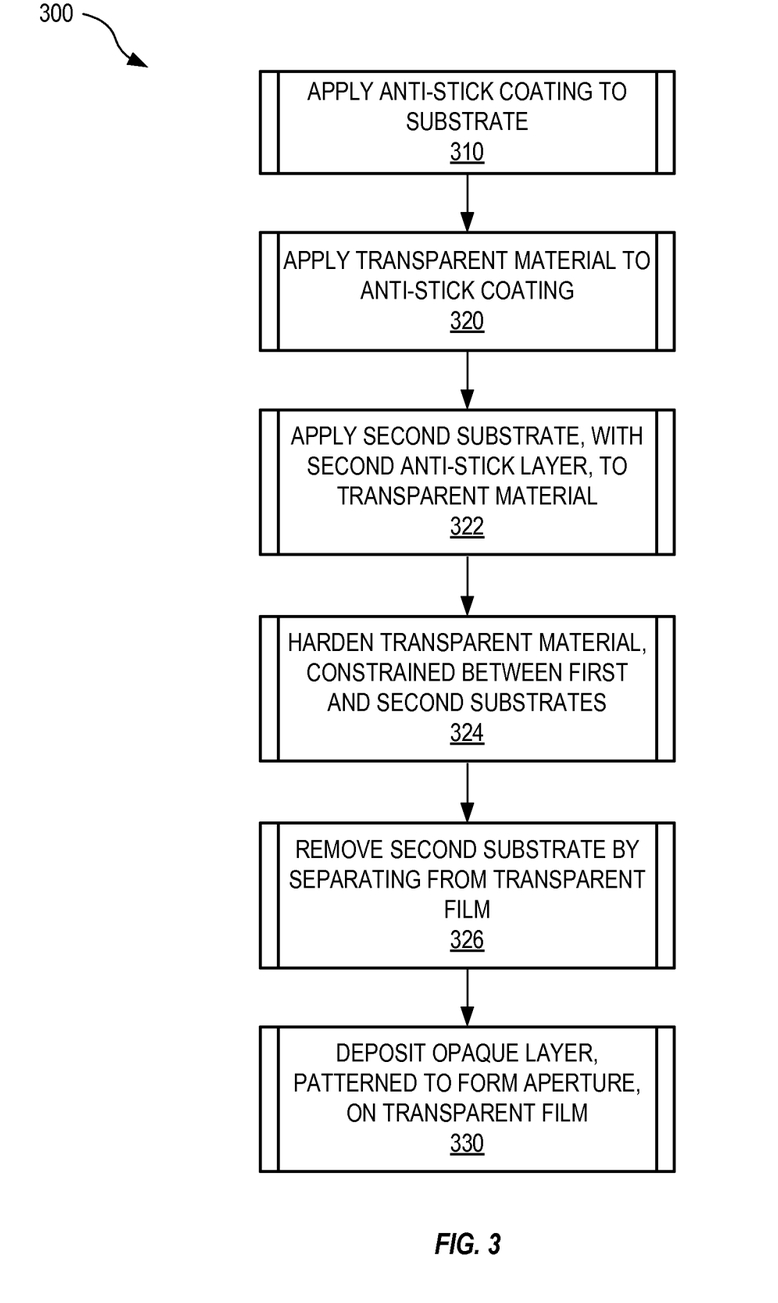
FIG. 3 is a block diagram showing steps of forming an aperture wafer, according to an embodiment.

FIG. 3 is a block diagram showing one exemplary method 300 of forming an aperture wafer. Method 300 is an embodiment of method 100 (FIG. 1). Step 310 is identical to step 210. In step 310, a first anti-stick coating is applied to a substrate as discussed in connection with FIG. 2. In a step 320, a transparent material is applied to the first anti-stick coating applied in step 310. In a step 322, a second substrate, containing a second anti-stick coating, is applied to the transparent material. This second substrate is, for example, formed by performing steps 310 and 320 or steps similar thereto. Although not illustrated in FIG. 3, the spacing between the two substrates may be controlled with spacers or a tool to determine the thickness of a film subsequently formed from the transparent material located between the two substrates, without departing from the scope hereof. Step 324 involves hardening the transparent material, while constrained between the first and second substrates, to form a transparent film. In an embodiment, the film thickness is less than 200 microns, because creating thicker films is impractical. In an embodiment, the hardening step 324 includes curing the polymer resin with UV light and/or baking at one or more elevated temperatures. In a step 326, the second substrate is separated from the transparent film along the interface between the transparent film and the second anti-stick coating. In an embodiment, the first and second anti-stick coatings have different stickiness properties, based upon the composition of the coating, such that the stack of layers is more easily separated at the second anti-stick coating. In an embodiment, the anti-stick coating contains fluorine and silicone, and the concentrations of fluorine and silicone are adjusted to alter stickiness permitting selective separation of the second substrate from the aperture wafer in step 326. Step 330 is an embodiment of step 230 of FIG. 2, wherein an opaque layer is deposited on top of the transparent film to form at least one aperture. In an alternate embodiment, the opaque layer is deposited after the hardened transparent film is stacked with a lens wafer (see FIG. 5).

Figure 4:
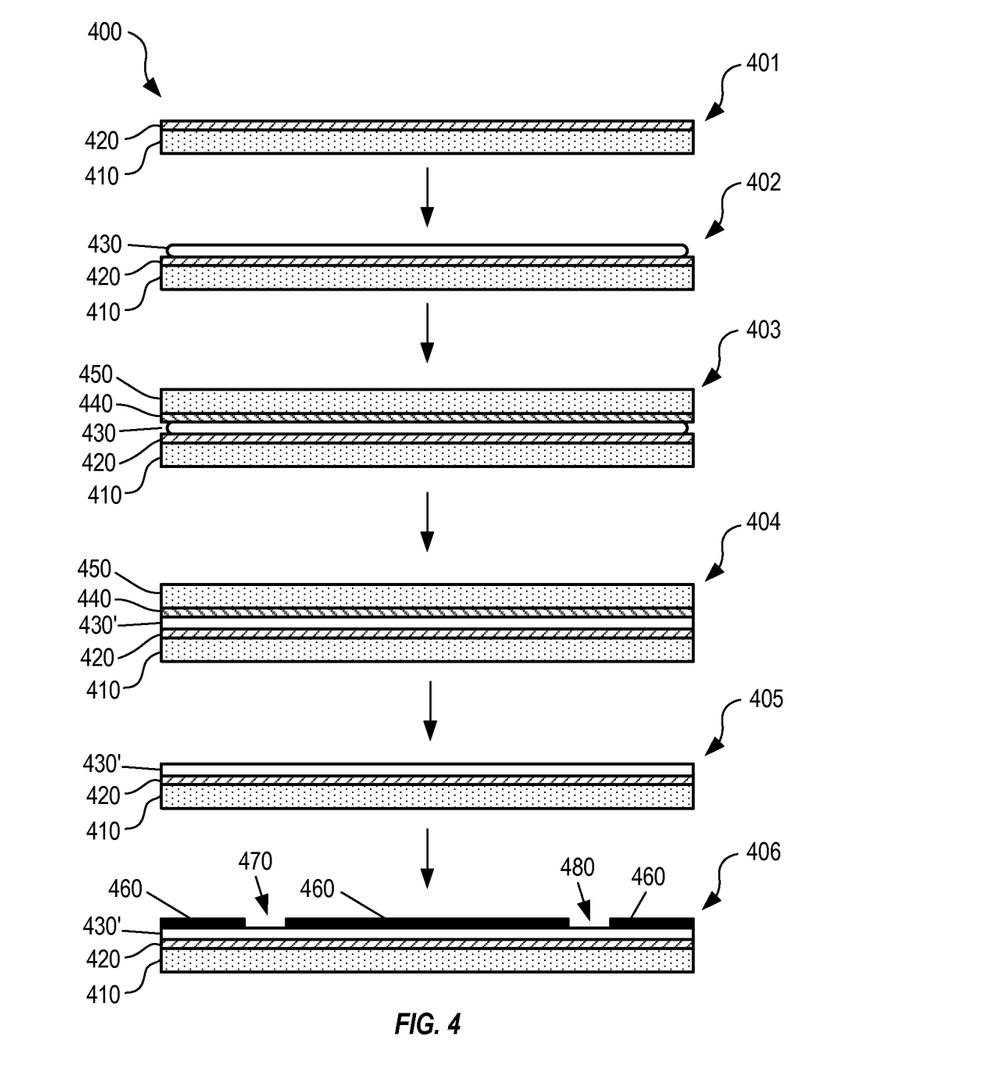
FIG. 4 is a sequence of schematic diagrams illustrating components of an aperture wafer formed during the steps of FIG. 3, according to an embodiment.

FIG. 4 is a sequence of schematic diagrams illustrating components of one exemplary wafer 400 during the series of aperture forming steps described in FIG. 3. Wafer 401 results from step 310 and includes a first substrate 410 with a first anti-stick coating 420 applied thereon. Wafer 402 further includes a transparent material 430 applied to anti-stick coating 420, resulting from performing step 320. Wafer 403 results from performing step 322 and further includes a second anti-stick coating 440 and a second substrate 450 on top of transparent material 430. Wafer 404 includes the components of wafer 403 following hardening step 324, wherein transparent material 430 is hardened to become transparent film 430'. Wafer 405 results from performing step 326 and, as compared to wafer 404, no longer includes second substrate 440 and second anti-stick coating 450. Wafer 406 is an aperture wafer resulting from performing step 330. In the embodiment illustrated in FIG. 4, an opaque layer 460 was deposited on transparent film 430', in a pattern forming a first aperture 470 and a second aperture 480. In an alternate embodiment, the opaque layer 460 is deposited after the hardened transparent film 430' is stacked with a lens wafer (see FIG. 5).

Figure 5:
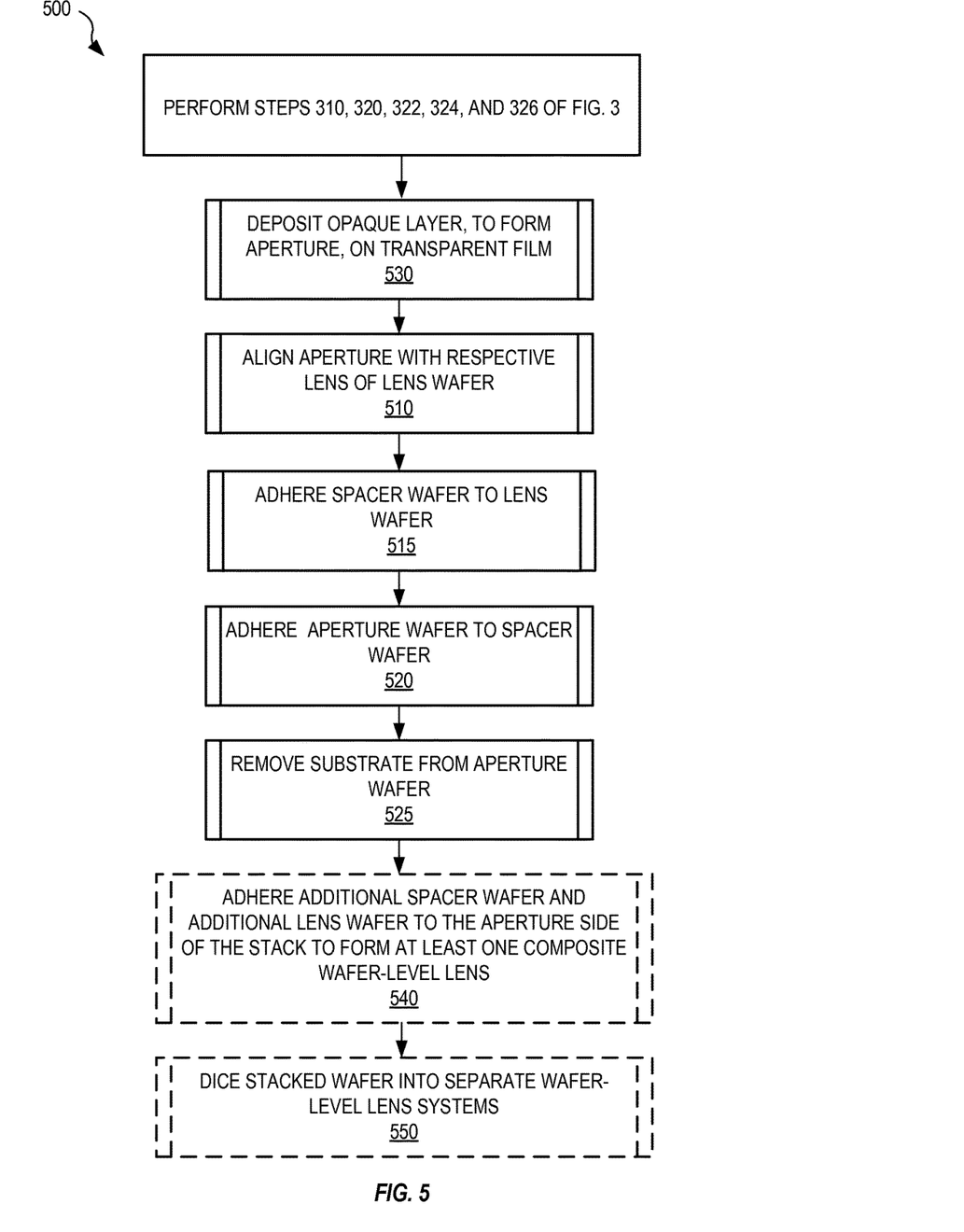
FIG. 5 is a block diagram showing steps of making apertured lenses, according to an embodiment.

FIG. 5 is a block diagram showing one exemplary method 500 of forming a wafer-level apertured lens system. Following steps 310, 320, 322, 324, and 326 of FIG. 3, method 530 performs step 330 of FIG. 3 to deposit opaque layer 406 on transparent film 430'. Following step 530, step 510 aligns the aperture of the aperture wafer with the respective lens of the lens wafer, step 515 adheres a spacer wafer to the lens wafer, step 520 adheres the aperture wafer to the spacer wafer to form a stack, and step 525 removes the substrate from the aperture wafer.

Figure 6:
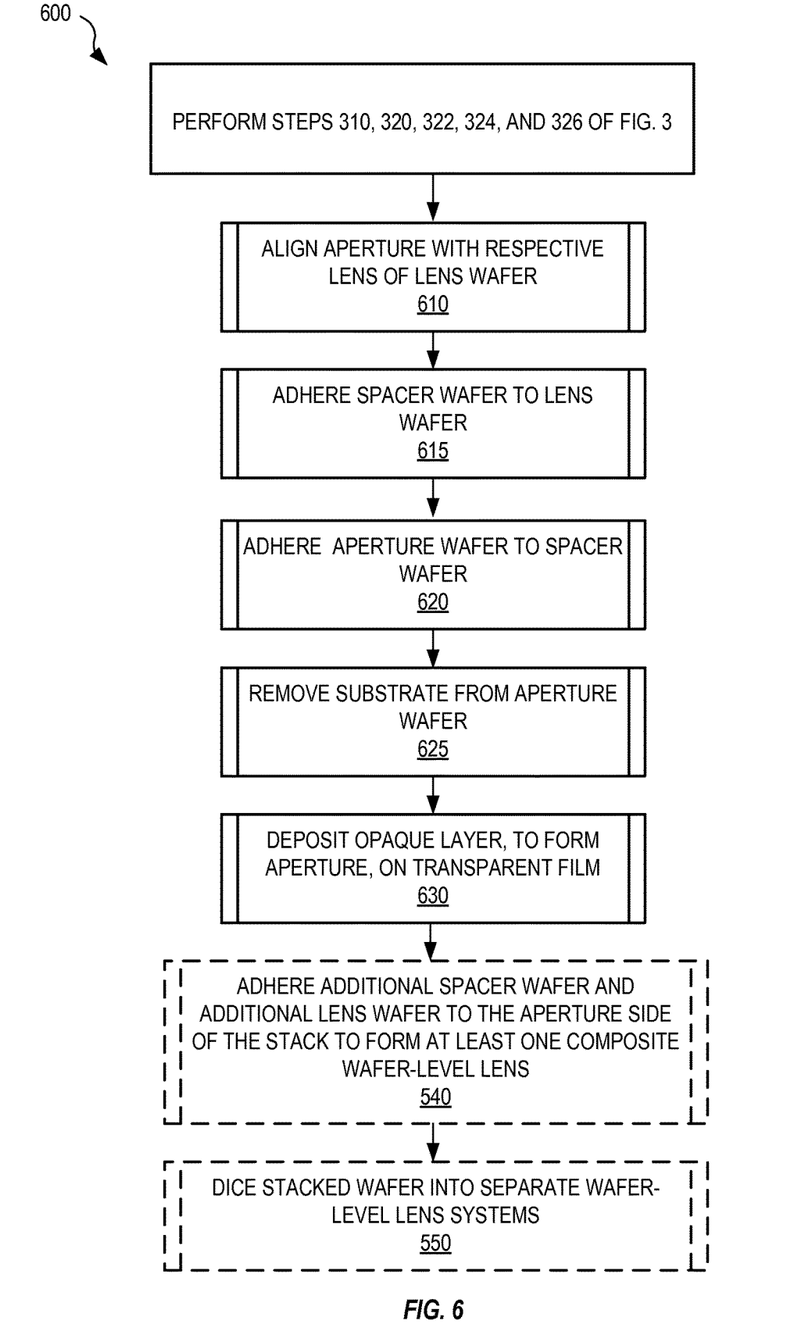
FIG. 6 is a block diagram showing steps of making apertured lenses, according to an embodiment.

FIG. 6 is a block diagram showing an alternate second exemplary method 600 of forming a wafer-level apertured lens system. Method 600 may use many of the same steps as method 500 rearranged in a different order. Specifically, after steps 310, 320, 322, 324, and 326 of FIG. 3 have been performed, step 610 performs step 510 of FIG. 5 to align the aperture with the respective lens, step 615 performs step 515 of FIG. 5 to adhere a spacer wafer to the lens wafer, step 620 performs step 520 of FIG. 5 to adhere the aperture wafer to the spacer wafer to form a stack, and step 625 performs step 525 of FIG. 5 to remove the substrate from the aperture wafer. Step 630 deposits opaque layer 406 on the exposed side of hardened transparent film 430', the exposed side being the side opposite the lens wafer.

Method 500 may be preferred to method 600 if the substrate 410 used to form the hardened transparent film 430' is of sufficient thickness. In certain cases, substrate 410 is required to be thin, to the point where it becomes fragile, and thus difficult to handle. In situations requiring thin substrates, method 600 may be the preferred method to use because the lens wafer provides support to the transparent film and substrate permitting *facile* handling. Following either method 500 or method 600, an optional step 540 involves adhering an additional spacer wafer and an additional lens wafer to the aperture side of the stack, thus forming at least one wafer-level apertured lens system. In an optional step 550, the wafer stack may be diced to form a plurality of individual wafer-level aperture and lens systems.

Figure 7:
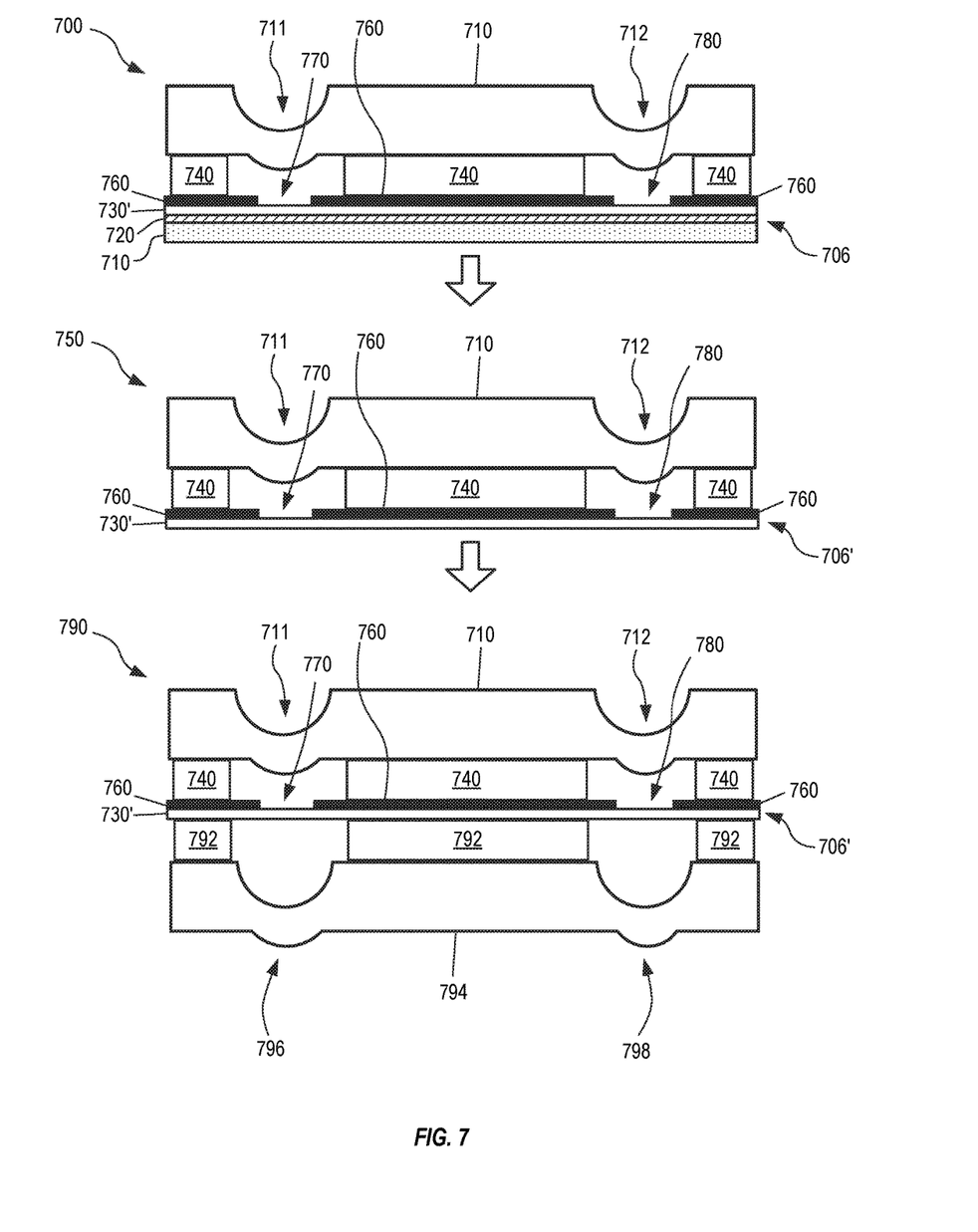
FIG. 7 is a schematic drawing illustrating stacked wafers at different steps of making apertured lenses, according to an embodiment.

FIG. 7 is a schematic drawing illustrating exemplary stacked wafers at different steps of forming the wafer-level apertured lens systems via method 500 of FIG. 5. Stack 700 illustrates completion of depositing the opaque layer 530, aligning the aperture and lens 510, adhering the spacer wafer 515, and adhering the aperture wafer 520. Note the presence of opaque layer 760 indicating method 500 of FIG. 5 (as opposed to method 600 in which the opaque layer is added after the wafers are adhered and the substrate is removed). Stack 700 includes a lens wafer 710 containing a first lens 711 and a second lens 712. Spacer wafer 740 is located beneath lens wafer 710 and above aperture wafer 706, which is an embodiment of aperture wafer 406 of FIG. 4. Aperture wafer 706 includes a first aperture 770 and a second aperture 780, which are embodiments of apertures 470 and 480 of FIG. 4, respectively. Aperture wafer 706 consists of a hardened transparent film 730', a first anti-stick coating 720, and a first substrate 710, which are embodiments of film 430', first anti-stick coating 420, and first substrate 410 of FIG. 4, respectively. Lenses 711 and 712 may have different form than shown in FIG. 7 without departing from the scope hereof. Also without departing from the scope hereof, apertures 770 and 780 may have different shape and/or size than illustrated in FIG. 7.

Stack 750 of FIG. 7 illustrates completion of step 525 of removing substrate 710 from aperture wafer 706 along the plane of anti-stick coating 720. Note the prime designation of aperture wafer 706' to indicate that substrate 710 was removed.

Stack 790 of FIG. 7 represents an exemplary embodiment following completion of optional step 540 of FIG. 5 to adhere an additional spacer wafer and lens wafer to form two wafer-level apertured lens systems. Specifically, a second spacer wafer 792 is adhered beneath the aperture wafer 706', and a second lens wafer 794, which includes a third lens 796 and a fourth lens 798, is adhered beneath the second spacer wafer 792. Lens 711, aperture 770, and lens 796 are aligned to form a first wafer-level apertured lens system, and lens 712, aperture 780, and lens 798 are aligned to form a second wafer-level apertured lens system.

In stack 790 of FIG. 7, apertures 770 and 780 are located in the aperture wafer 706', and between lens wafers 710 and 794. In contrast, the prior art consists of apertures formed directly on a lens wafer. The advantages of creating a separate aperture wafer include 1) preventing residual material from accumulating on the lens during the opaque-layer deposition process, and 2) enabling the ability to locate the aperture with respect to one or more lenses independently of the lens wafers. Locating an aperture in an aperture wafer with respect to lenses involves positioning in three dimensions. The first and second dimensions are in the plane of the wafer wherein the aperture is aligned with one or more lenses, and the third dimension is orthogonal to the plane of the wafers wherein the lens and aperture wafers are spaced using spacer wafers. Spacer wafers 740 and 792 may be the same or different thicknesses depending on how the system is designed to control light propagation through it. Thus, the aperture wafer combined with the spacer wafers provide additional flexibility in wafer-level apertured lens system design that is unavailable using prior art methods.

Figure 8:
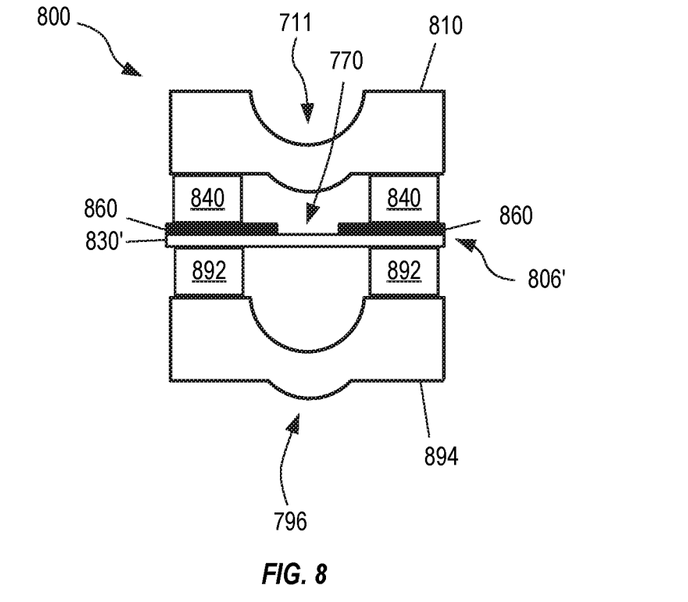
FIG. 8 is a schematic drawing showing a single wafer-level apertured lens system, according to an embodiment.

FIG. 8 is a schematic drawing showing an exemplary single wafer-level apertured lens system 800 following optional step 550 of FIG. 5 wherein wafer stack 790 of FIG. 7 is diced into individual wafer-level apertured lens systems. FIG. 8 shows a first lens layer 810, which is a portion of first lens wafer 710 of FIG. 7, a first spacer layer 840, which is a portion of first spacer wafer 740 of FIG. 7, an aperture layer 806', which is a portion of aperture wafer 706' of FIG. 7, a second spacer layer 892, which is a portion of second spacer wafer 792 of FIG. 7, and a second lens layer 894, which is a portion of second lens wafer 794 of FIG. 7. The wafer-level apertured lens system of FIG. 8 retained the first lens 711, the first aperture 770, and the third lens 796 of wafer stack 790 of FIG. 7.

Figure 9:
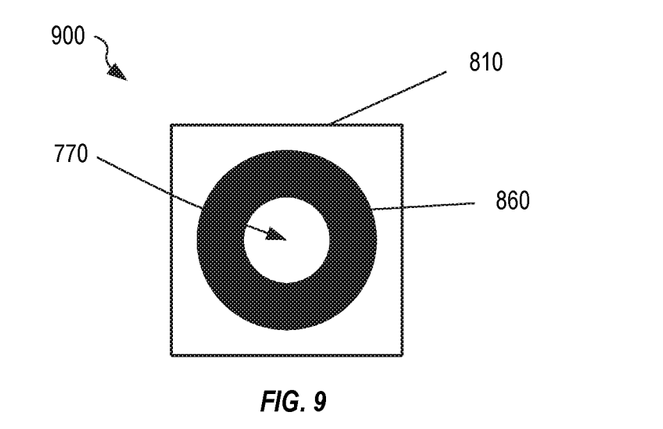
FIG. 9 is a top view of the wafer-level apertured lens system of FIG. 7, according to an embodiment.

FIG. 9 shows a top view 900 of the wafer-level apertured lens system 800 of FIG. 8, illustrating aperture 770, opaque layer 860, and lens layer 810.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wafer-level method for making apertured lenses, comprising:
    applying an anti-stick coating to a planar surface of a first substrate;
    applying a biplanar transparent film to the anti-stick coating, the biplanar transparent film having a bottom planar surface proximate the anti-stick coating and a top planar surface opposite the bottom planar surface; and
    depositing an opaque layer, having an aperture therethrough, on the top planar surface such that the opaque layer and the anti-stick coating are on opposite sides of the biplanar transparent film;
    adhering a first spacer wafer to the opaque layer and adhering a first lens wafer to the first spacer wafer such that (a) the aperture is aligned with a first lens of the first lens wafer and (b) where the first spacer wafer is between the first lens wafer and the biplanar transparent film, a minimum distance between the first lens wafer and the biplanar transparent film exceeds a thickness of the first spacer wafer;
    removing the first substrate and the anti-stick coating from the bottom planar surface;
    adhering a second spacer wafer to the bottom planar surface and adhering a second lens wafer to the second spacer wafer such that (a) the aperture is aligned with a second lens of the second lens wafer, and (b) the second spacer wafer is between the bottom planar surface and the second lens wafer.

2. The method of claim 1, further comprising:
    applying a second substrate, containing a second anti-stick coating, to the biplanar transparent film and opposite the first substrate;
    hardening the transparent film, while the biplanar transparent film is constrained between the first and second substrates; and
    removing the second substrate by separating it from the biplanar transparent film, at the interface between the transparent film and the second anti-stick coating.

3. The method of claim 2, the steps of applying a second substrate, hardening the biplanar transparent film, and removing the second substrate being performed between the steps of applying a biplanar transparent film and depositing an opaque layer.

4. The method of claim 1, the step of depositing comprising:
    lithographically depositing the opaque layer.

5. The method of claim 1, the step of adhering the second spacer yielding a stacked wafer, and further comprising dicing the stacked wafer into a plurality of stacked wafer-level apertured lens systems.

6. The method of claim 1, the step of removing the first substrate from the opaque layer, comprising removing the entire first substrate from the opaque layer.

7. The method of claim 1, the step of removing the first substrate being performed after the step of depositing the opaque layer.

* * * * *